United States Patent [19]

Kafri et al.

[11] Patent Number: 4,459,027

[45] Date of Patent: Jul. 10, 1984

[54] METHOD AND EQUIPMENT FOR MAPPING RADIATION DEFLECTION

[75] Inventors: Oded Kafri, Beer-Sheva; Aminadav Livnat, Arad, both of Israel

[73] Assignee: The State of Israel, Atomic Energy Commission, Beer-Sheva, Ill.X

[21] Appl. No.: 314,116

[22] Filed: Oct. 22, 1981

[30] Foreign Application Priority Data

Nov. 4, 1980 [IL]  Israel .................................. 61405
Jul. 9, 1981 [IL]  Israel .................................. 63264

[51] Int. Cl.³ ............................................ G01B 11/14
[52] U.S. Cl. .................................. 356/376; 356/128; 250/237 G
[58] Field of Search .................. 356/128, 129, 376; 250/237 G

[56] References Cited

U.S. PATENT DOCUMENTS 2,541,437  2/1951  Prescott .............................. 356/129
4,139,291  2/1979  Parthasarathy .................. 250/237 G

OTHER PUBLICATIONS

Oster et al., "Moire Patterns" *Scientific American*, May 1963, pp. 54–63.

Terada et al., "Photogrametric Application of Moire Fringes Produced with a Parallel Beam of Light" *Optical Engineering*, vol. 18, No. 4 (Jul.–Aug. 1979), pp. 399–402.

Kawara, "Corneal Topography Using Moire Countour Fringes" *Applied Optics*, vol. 18, No. 21, (Nov. 1, 1979) pp. 3675–3678.

*Primary Examiner*—R. A. Rosenberger
*Attorney, Agent, or Firm*—Browdy and Neimark

[57] ABSTRACT

Equipment and method for mapping an object using moiré deflectometry wherein collimated radiation deflected from the object is used to generate a moiré pattern and wherein by measuring linear deflections in the pattern, variations in characteristics of the object is determined.

11 Claims, 8 Drawing Figures

Fig. 3
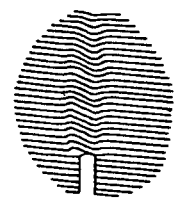
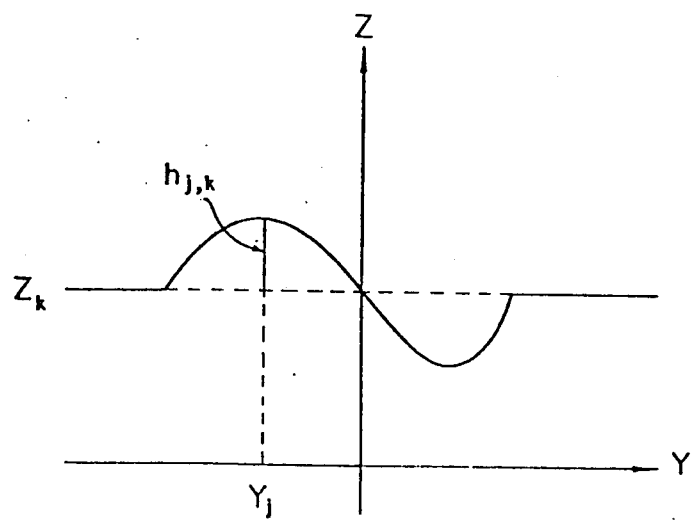
Fig. 4

METHOD AND EQUIPMENT FOR MAPPING RADIATION DEFLECTION

FIELD OF THE INVENTION

This invention is related to optical methods and equipment for using beams of radiant energy deflected by the objects for quantitative mapping of the objects. The objects include objects wherein the deflections are obtained by reflections from the surface of the objects and phase objects wherein the deflections are obtained by refraction of the light passing through the objects.

BACKGROUND OF THE INVENTION

In accordance with this invention, unique Moir/ deflectometry methods and equipment are used for both radiant deflection by refraction and reflection. The methods provide results that are on a par with Mach Zehnder interferometery. In both methods radiant deflection gratings or rulings are used to provide moiré fringes. Deviations from the straight lines of the moiré fringes are analysed to provide the sought-after quantitative measurements. Unlike conventional interferometery the methods to be described do not measure differences in optical length. Instead the method to be described measures deflections of beams away from the collimated pattern.

In comparison with interferometery, the moiré deflectometry involves very simple alignment and therefore is much easier and less expensive to set up and nonetheless provides extremely reliable and accurate results.

The methods described herein do not require coherent light. The equipment comprises the two gratings, a collimated light source, a screen and a recording media. The methods are most attractive for low sensitivity measurements where the stability requirements of the moiré deflectometry unlike those of interferometery are just one order of magnitude lower than the measured quantity. In contrast in interferometery the maximum permissible movement during the measurement is about $\lambda/10$. To maintain an upper limit of movement below this maximum is difficult and requires extremely specialized and sophisticated equipment.

There are many uses and therefore much need for reliable optical methods and equipment for analysing phase objects. Phase objects do not absorb or reflect light in general but change the phase of the light or deflect it. Examples of phase objects are such sundry items as lenses and even variations in the density of fluids which also cause the deflection of light. Thus, for example, equipment to analyze phase objects is useful for wind tunnels.

Prior art quantitative ways of detecting phase changes in beams caused by phase objects are well known interferometric technique as disclosed, for example, in the book entitled "Principles of Optics" by M. Born and E. Wolf published by Pergamon New York, 1970, on pages 256–370. The phase contrast method is also used to quantitatively determine the angular deflection in phase objects. Such prior art methods use difficult tuning steps and require high stability. The difficulties in meeting these criteria cause most phase objects to be analyzed optically by semi-qualitative methods such as the "Schlieren" photography method and "Shadowgraphy" such as described, for example, in the above-mentioned "Principles of Optics" book at page 425.

The problem with semi-qualitative methods of phase-object analysis is that the actual quantities required are not provided. Thus, there is a dire need in the art for a reliable quantitative method and equipment for mapping phase objects capable of replacing the interferometric techniques. The quantitative method should be at least as easy to perform as "Schlieren" photography of Shadowgraphy and should provide highly reliable quantitative results.

In the past topographical analysis of surfaces such as those of mirrors and lenses, for example, have been made using interferometry and spectography. Such measurements are extremely delicate and require highly trained technicians using costly equipment and coherent energy sources. Thus the present methods in use suffer because of the high mechanical stability required. Accordingly costly and expensive equipment is required.

Accordingly it is an object of the present invention to provide new and improved methods and equipment for quantitatively mapping objects including phase objects through which the radiation passes and also the topography of a given surface which reflects the radiation, in which the above-referred to problems and disadvantages are substantially reduced or overcome.

SUMMARY OF THE INVENTION

According to the present invention a method of securing a quantitative analysis of an object is provided, said method comprising the steps of:

collimating radiation energy to provide colimated rays, directing said collimated rays to said object, using rays deflected by said object for generating a moiré pattern, measuring linear deflection in said pattern at selected points, and computing the angular deflection caused by said object as a function of said measured linear deflection to determine variations in characteristics of the object.

Further according to the present invention equipment for accomplishing the quantitative mapping of the surface is provided, said equipment comprises:

means for collimating radiant energy to provide collimated rays, means for directing said collimated rays to the object being analysed, means responsive to rays deflected by said object for generating a moiré pattern, means for measuring linear deflections in said pattern at selected points, and means for computing angular deflection as a function of said measured linear deflections to determine variations in characteristics of the object.

A further feature of the present invention is the utilization of a pair of rulings or gratings spaced apart from each other by a fixed known distance for generating the moiré pattern.

Yet a further feature of the present invention is providing a screen directly behind the second of the two spaced apart rulings. The screen shows the moiré pattern which can be photographed or transmitted through a television type camera to a computer for the computation of the quantitative angular deflection on different points of the phase object. By turning an irregular phase object the complete quantitative angular deflection map of the phase object can be produced. Since there are three planes, measurements from six points provides a complete map of the phase object.

Still a further feature of the present invention provides a screen directly behind the second of said two spaced apart rulings. The screen captures the moiré pattern which can be photographed or transmitted through a television type camera to a computer for the computation of the quantitative topographical map of the surface. The measurements of the photographed pattern can be used to provide data that gives the derivatives, i.e. the slopes of the variations in the elevation or topography of the surface. The derivatives are integrated to find the actual linear variations in the elevation of the surface being analysed and a complete quantitative analysis of the topographical features of the surface are provided.

Yet another feature of the invention provides for coating a given surface, even a transparent surface, with a reflective liquid to enable quantitative topographical analysis of that surface in accordance with the method and equipment described herein.

BRIEF DESCRIPTION OF THE DRAWINGS

The method and equpment of the present invention will become more fully apparent from the description of a preferred embodiment of the present invention taken in conjunction with the following drawings in which:

FIG. 3 is a showing of the deflections caused in the moir/é pattern by collimated light passing through a phase object represented by a candle flame;

FIG. 4 shows the linear deflection measurements taken to determine the angular deflection;

GENERAL DESCRIPTION

Figure 1:
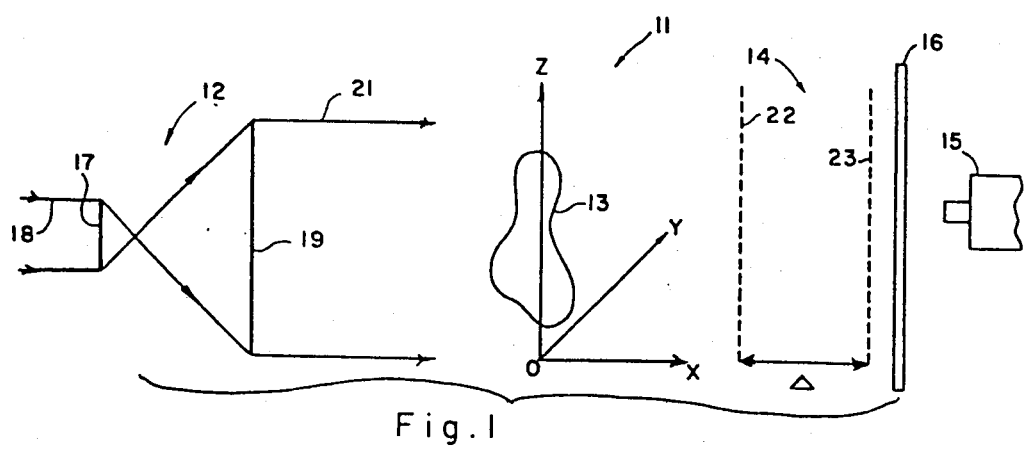
FIG. 1 is a schematic showing of the phase object mapping equipment.

The first example of object mapping equipment to be described in the phase mapping equipment 11 of FIG. 1 which includes means for collimating radiant energy such as light generally shown at 12. The phase object being mapped is indicated at 13 and means for generating a moiré pattern is generally shown at 14. The moiré pattern is depicted on a screen shown as 16. The moiré pattern can then be photographed by equipment indicated at 15 and measurements made on the photographs. Alternatively, the screen can be replaced by a television camera or the camera may be provided to forward the pattern directly to a computer for the necessary computation to determine the quantitative angular deflections caused by the phase objects.

In an embodiment of the invention the collimated light generating means was provided by a telescope comprised of a first lens 17 focusing light rays such as depicted by the arrow 18 and a second lens 19 for transmitting the collimated light depicted by the arrows such as arrows 21 to the phase object 13.

The phase object 13 is shown in an orthogonal system, shown by the X,Y and Z axes, for explanatory purposes. The X, Y and Z axes have a common origin.

The collimated beam passes through the phase object 13 and reflects the shadow of a first grating or ruling 22 onto a second grating or ruling 23. The two gratings or rulings each have the same pitch (p). It should be noted that the rulings 22 and 23 are separated from each other by a fixed distance $\Delta$ and are substantially parallel to each other. There is a small angle $\theta$ between the two rulings. The angle is best seen in the normal moiré pattern shown in FIG. 2.

Figure 2:
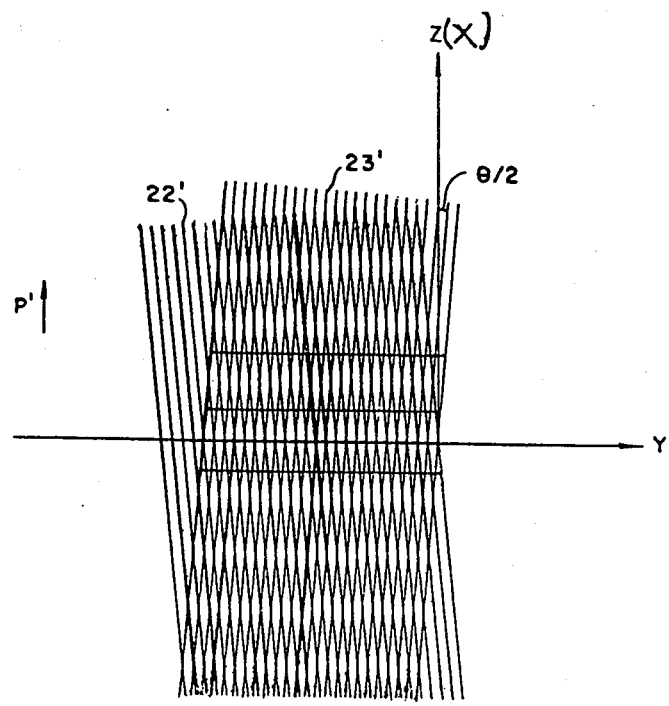
FIG. 2 is a step in the development of the moiré pattern using the rulings of FIG. 1.

The moiré pattern comprise a tunable grating perpendicular to the original rulings or grating grooves. The unique moiré pattern obtained as hereinafter disclosed makes it possible to immediately obtain quantitative refraction index data on the phase object. Also, it should be noted that the moiré pattern of FIG. 2 is in the ZY plane. The ruling or grating 22 is moved a distance $p/[\cos(\theta/2)]$ in the Y direction which cause the moiré pattern to move a distance $p' = p/2 \sin(\theta/2)$ in the Z direction. $\theta$ is the angle between the rulings and the axis.

In a preferred embodiment a matte screen 16 was actually attached directly to the back of grating 23. The distance $\Delta$ was half a meter. The movement p' of the moiré pattern of FIG. 2 is actually an amplified movement. The amplification is the ratio of the pitches (p) of the grooves of the pattern to the gratings. The amplification, A, is therefore equal to $\frac{1}{2} \cot(\theta/2)$. Thus the distortion of a line such as line $Z_k$ shown in FIG. 4 caused by the passing of a beam through a phase object such as the flame of a candle (FIG. 3) can be measured on a photograph of the moiré pattern of FIG. 3. The distortion of line $Z_K$ as shown in FIG. 4 is a distortion in the ZY plane at point $Z_k, Y_j$. The linear deflection $h_{jk}$ which is measurable is mathematically converted into an angular deflection. The angular deflection $\phi$ is equal to $h_{jk}\theta/A\Delta$ or $(h_{j,k}2\tan(\theta/2)/\Delta$. When $\theta$ is small $\phi_{j,k}$ is equal to $h_{j,k}\theta/\Delta$.

Thus using the equipment shown in FIG. 1 it is possible to determine the angular deflection in the Y direction. The resolution in Z is determined according to the distance between the grooves on the tunable grating of the moiré pattern. The resolution in the Y direction is determined according to the pitch of the original Ronchi rulings.

The application of this technique to a refractive index gradient moiré pattern can make the prior art Nishijima and Oster methods fully quantitative. These methods are described in articles in the Journal of the Optical Society of America No. 54 at page 1 in an article authored by Y. Nishijima and G. Oster published in 1964 and an article in the same journal at page 169 authored by G. Oster and M. Wasserman and C. Zwerling, respectively. The basic equation of the collimated ray is given by $$\frac{d}{ds}\left[n(x,y,z)\frac{dr}{ds}\right] = \nabla n(x,y,z), \quad (4)$$

where r is a position vector of the ray and s is the Poynting vector. If the ray is perpendicular to the X direction and starts at the origin and if we assume that the deflections are small, namely ds≃dx then $$\frac{dr}{ds} = \phi_{j,k}(X) = \frac{1}{n(x,y)} \int_0^x \frac{\partial n(u,y)}{\partial y} du, \quad (5)$$

where $\phi$ is a deflection angle in the Y direction and the integral is performed along the line $y-y_i$, $Z=Z_x$. If one assumes that, at the end of the phase object, at $x=x_f$, $n=n_f$ then one obtains the following equation $$\phi_{j,k} = \frac{1}{n_f} \int_0^{x_f} \left(\frac{\partial n}{\partial y}\right)_{zk,yj} dx. \quad (6)$$

It becomes apparent from the equation for $\phi$ that there is a connection between the deflection of the fringe and the index of refraction integral. In interferometry one measures phase changes that are proportional to ndx changes. Since the mapping of the index of refraction of cylindrical symmetrical objects requires the use of the "Abel" transformation (see the Journal of Optical Society of America at volume 51 and 943 published in 1961 in an article by K. Bachestem). The last equation is more readily used, as it does not involve additional numerical derivatives. From this last equation it can be shown that $\phi_{jk}/y_i$ is the inverse Abel transformation of $\eta(r)$. The phase object can be turned and the five other independent mappings, namely $\phi k,j$, $\phi i,k$, $\phi i,j$ and $\phi j,i$ can be accomplished.

The deflection of the rays caused by the phase object under study is determined quantitatively by directing collimated rays through the phase object thereby deflecting the rays. The deflected rays pass through a pair of spaced apart angled ($\theta$), gratings to cast an unique moiré image on a screen.

Without the deflected rays the moiré image is a tunable grating perpendicular to the grooves of the original grating with a pitch:

$$p' = p/(2 \sin (\theta/2))$$

The deflected rays cause linear deflections in the tunable grating which are physically readily measurable and convertible to angular deflection values.

Summarising the very simple method taught herein can replace, in many cases the interferometric techniques. Unlike other methods, previously used for phase object mapping the stability and alignment requirements are limited to the accuracy of the measurements so that the method taught herein is especially suitable for low resolution measurement such as flame, vapor gradient and shock wave analysis.

Figure 5:
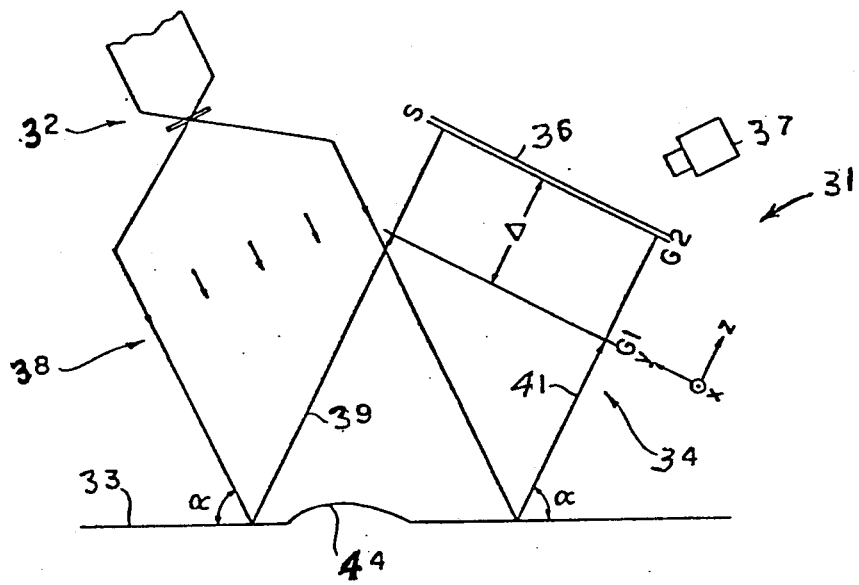
FIG. 5 is a schematic showing of an embodiment of the topographical mapping equipment.

The second example of object mapping equipment to be described is the topographical mapping system 31 shown in FIG. 5 which comprises a source of collimated light indicated at 32. The collimated light is directed to surface 33. The reflected light is used to provide moiré patterns with equipment shown generally at 34.

The equipment comprises a first grating $G_1$ a fixed distance $\Delta$ from a second grating $G_2$. As shown, particularly in FIG. 2 the gratings are turned at an angle $\theta$ to each other. Note that for the topographical measurements the gratings have been arbitrarily placed in the XY plane. Behind the second grating is a screen 36. Means such as camera 37 are provided for recording the moiré pattern projected onto the screen 16. The camera 37 could of course be television equipment connected to a computer for automatically quantitatively analysing the moiré pattern or Moiré fringes on the screen 36.

The source of collimated radiation such as light collimator 32 provides parallel rays indicated by the arrows 38 pointing towards surface 33. The reflected light is indicated by the arrows 39 and 41. The angle of incidence and reflection are both shown as $\alpha$. As long as the surface 33 is flat with no positive or negative elevational variations then the Moiré pattern is similar to the one shown in FIG. 7b where the lines of the moiré fringe such as line 42 and 43 are straight and parallel to each other. However, if there is an elevational variation in the surface such as the positive variation shown at 44 in FIGS. 5 and 6, then the reflected light will not be completely collimated since the light reflected from the variation will be at an angle shown as $2\beta$ to the regularly reflected light. The non-collimated reflected beams cause variations in the moiré pattern such as shown in the magnified view in FIG. 7a.

Figure 6:
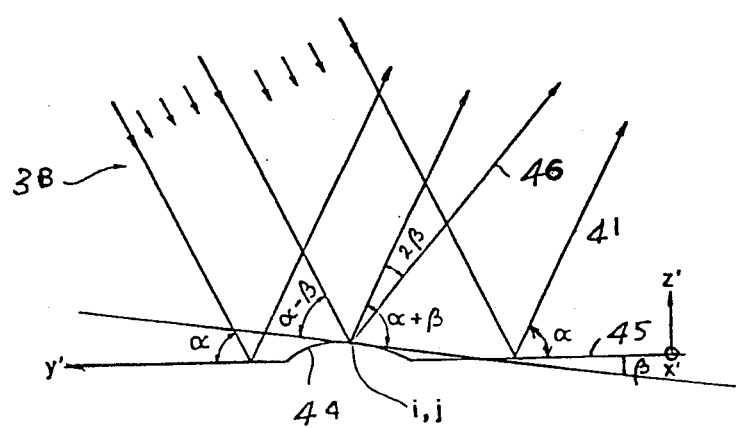
FIG. 6 is a schematic showing of the reflected beam of FIG. 1 at an elevational discrepancy in the surface being analysed.

Three orthogonal reference axes, X, Y and Z are shown in FIG. 5. The rulings and the screen are in the plane defined by the XY axes. As shown in FIG. 6 the topographical analysis is made at points such as point i, j of the elevational variation 44. Note that in FIG. 6 the orthogonal reference axes of the surface being analyzed are depicted as axes X', Y' and Z'. The surface is in the plane defined by the X'Y' axis and is at an angle $\beta$ to a tangent 45 drawn to the point i,j. The elevational variation is in the plane X'Z'. The tangent of the angle $\beta$ is the derivative $(dZ'/dY')i,j$. The reflected beams from the surface where there is no variation such as beam 41, are at an angle $\alpha$ from the surface. However the angle of reflection of the beam 46 reflected from the elevational variation is $\alpha+\beta$. Thus the beams reflected from the variations are not necessarily parallel to each other and are not parallel to the originally reflected beams and therefore the reflected light is not completely collimated. It is the deflected reflected beams that cause the variations in the moiré pattern which make it possible to carry out the topographical mapping method described herein.

The moiré pattern or fringes comprise a tunable grating substantially perpendicular to the original rulings or grating grooves. The unique moiré pattern obtained as hereinafter disclosed makes it possible to obtain quantitative topographical data on the object.

When the reflective surface 33 is flat, the moiré pattern consists of straight parallel lines with a pitch p'. The pitch p' of the moiré pattern is related to the pitch p of the gratings (the gratings have the same pitch) by the equation:

$$p' = p/2 \sin (\theta/2) \quad (1)$$

The surface axes X', Y', Z' are related to the screen axes by the equations:

$$X = X' \quad (2)$$

$$Y = Y'/\sin \alpha \quad (3)$$

At the point i,j where the surface is not flat the slope of line 45 as previously noted is:

$$dZ'/dY' = \beta \quad (4)$$

When the reflected rays are deflected for any reason, the straight moiré fringe lines that are parallel to the Y axis deviate towards the X axis; thus, for example, in FIG. 4a at point $x_i$, $y_j$ by an amount $h_{ij}$. The angles $\phi_{ij}$ of the ray at this location towards the Y direction is given by the equation $$\phi_{ij} = \frac{h_{ij} 2 \sin\left(\frac{\theta}{2}\right)}{\Delta} = \frac{dx}{dy} \quad (5)$$

Thus, from a photograph of screen 36, i.e. a deflectogram it is possible to map the ray deflections. The ray deflections in turn provide information about the slopes (dz'/dy') of the reflective surface. More particularly from FIG. 2 it is seen that the ray at the elevational variation deviates from the collimated reflected beam direction by the angle $2\beta$. Hence, the variation in elevation causes the ray deflection of $2\beta$ which in turn causes the $\phi$ deflection in the XY plane of the screen.

Thus $$2\beta_{i,j} = \phi_{i,j}, \text{ and} \quad (6)$$
$$\beta_{i,j} = \frac{h_{i,j} \sin \theta/2}{\Delta}$$

Note that while $\beta_{i,j}$ does not depend on the angle of incidence $\alpha$, the Y axis is scaled according to $\sin \alpha$ so that usually values of the angle $\alpha$ close to 90° are preferred.

Figure 7:
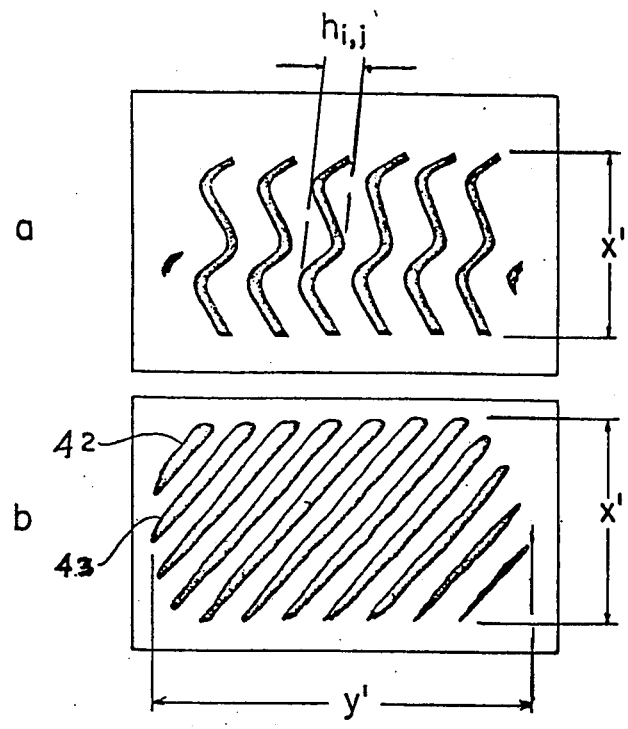
FIG. 7a is a showing of the deflections caused in the moiré pattern by an elevational discrepancy in the surface such as that shown in FIG. 2.
FIG. 7b is a showing of the moiré pattern when the surface being analysed has no elevational discrepancies positive or negative.

In a preferred embodiment the collimated light beam 38 represented in FIG. 5 consists of a collimated light beam 10.8 cm in diameter produced by a 5 milliwatt He,Ne laser. The reflective surface depicted is oil contained in a bath. FIG. 7a shows the deflectogram caused by a wave in the oil bath induced by touching the bath slightly. Thus with the deflectogram of FIG. 7 it is possible to obtain the actual elevational variation (+ or −) between a flat surface and a surface with a topographical depression (−) or elevation (+).

The angle $\alpha$ is determined using the equation $y = Y'/\sin \alpha$. The length y' of the bath is known and the length y on the screen is measured. Thus $\alpha$ is readily calculated from $\sin \alpha = y'/y$.

Similarly the value of $\theta$ can either be calculated or obtained from the test input information. It is preferable to calculate it and check it against the input information to assure that the proper measurements have been taken. The value of $\theta$ is calculated from the ratio between the pitch p' in FIG. 7b and the pitch of the gratings using equation (1). $\beta$ is then calculated using the $h_{ij}$ measured on the deflectogram represented by FIG. 7a. The actual elevation variation is then obtained by integrating $\alpha$ over Y' to obtain the value of Z'.

In the measurements run with preferred embodiments of the invention the value of $\alpha$ calculated from the length of the bath on the screen was found to be 0.225 radians. The value of $\theta$ as calculated from the ratio between the measured pitch p' on the screen and the original pitch of the gratings was found to be 0.036 radians.

By actual measuring on the photograph (deflectogram, represented by FIG. 7) the deviation $h_{ij}$ was determined. The effect of the objective lens of the camera was first determined by measuring in the X direction and comparing it with the measurement X' of the actual bath. Using FIG. 7 the lens factor was approximately 2.

The measured deviation ($h_{ij}$) from the straight line in FIG. 4a was found to be approximately 0.6 cm uncorrected or 1.2 cm.

By using this figure the calculation of $\beta$ was made. By obtaining $\beta$ at different points it is possible to integrate $\beta$ and obtain the value dZ'/dY'. Since the value of Y' is known by actual measurements the value of Z' can be readily calculated.

In the actual measurements, the overall height of the wave was calculated to be approximately 7 micrometers and the sensitivity of measurement was approximately 0.5 micrometers so that the measurement of Z', the height of the wave caused by touching the bath was found to be 7±0.5 micrometers.

Figure 8:
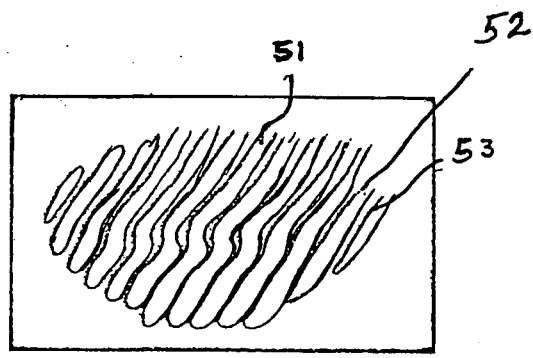
FIG. 8 is a deflectogram showing a moiré pattern made of a surface with elevational discrepancies.

FIG. 8 is a drawing of a deflectogram made of the effects of touching the oil surface with a needle. Calculations using the deflectogram of FIG. 8 show the maximum height to be about 2 micrometers. Note that in FIG. 8 the major deviation is at the center of the photograph were the pin was inserted, i.e. along moiré fringe line 51. The deviation in the moiré pattern is not discernible between fringe line 52 for example and fringe line 53. Thus there is a ripple caused by touching the surface of the bath with the needle, but the ripple becomes too small to be discernible at the ends of the bath where the lines are parallel.

In brief by using the method of the invention it is possible to measure the topography of reflective surfaces. The method does not require coherent light and measures quantities that are slope derivatives rather than lines of equal height. Its sensitivity is greater than that of shadow moiré by about 3 orders of magnitude. In addition unlike methods using interferometery the stability requirements are limited by a sensitivity of the measurement rather than by the wave length of the radiation. The sensitivity can be changed merely by varying the spacing of the gratings. Since the quantities measured with this method are derivatives the method may be even more sensitive than interferometery in cases of high derivatives. The method is not limited to highly reflective surfaces but can be used for transparent components such as glass or any relatively flat surface that is not disturbed by applying a coat of reflective liquid thereto, for example.

While the principles of the invention have been described above in connection with specific apparatus and applications, it is to be understood that this description is made by way of example only and not as a limitation on the scope of the invention.

What is claimed is:

1. A method of determining properties of an object on the basis of the degrees of deflections of rays by the object for providing quantitative measurements, the steps comprising:

providing from a source a beam of collimated rays;

providing first and second gratings, oriented at a preselected angular orientation with respect to one another, to produce moiré patterns as a result of the rays directed thereto; and placing the object in the path of the rays prior to reaching said gratings, whereby at least some of the rays are deflected by said object and effect the moiré patterns in a measurable way, so that the degrees of deflections of the rays by the object are determinable therefrom to provide quantitative measurements.

2. A method as recited in claim 1 wherein the determinable properties of said object are the light refractive indices thereof as a function of the degrees of deflections of the rays thereby.

3. A method as recited in claim 1 wherein the properties of the object to be determined are its topographic shape with respect to a preselected plane, said object being characterized by a substantially perfect reflective surface for reflecting rays directed thereto from said source to said first grating.

4. A method as recited in claim 1 wherein said object is placed between said source and the first grating and said gratings are spaced apart a preselected distance, definable as $\Delta$, and their lines are at an angular orientation with respect to one another, definable as $\theta$.

5. A method as recited in claim 1 wherein the spacings between the lines of each grating is substantially constant, and wherein the space between the two gratings, definable as $\Delta$, provides an unobstructed path for rays to pass from said first grating to said second grating.

6. A method as recited in claim 1 wherein the angular orientation between said first and second gratings is an angle definable as $\theta$, the gratings are spaced apart a distance, definable as $\Delta$, the space providing an unobstructed path for rays to pass from said first grating to said second grating, whereby the angular deflection of a ray by said object definable as $\phi$ is directly related to a product which is a fraction of a linear moiré pattern displacement definable as h and $\theta$ and inversely related to $\Delta$.

7. A method as recited in claim 6 wherein the determinable properties of said object are the light refractive indices thereof as a function of the degrees of deflections of the rays thereby.

8. A method as recited in claim 6 wherein the properties of the object to be determined are its topographic shape with respect to a preselected plane, said object being characterized by a substantially perfect reflective surface for reflecting rays directed thereto from said source to said first grating.

9. An apparatus for mapping beam deflection caused by an object, comprising:
source means for producing a beam of collimated rays of light;
moiré pattern producing means including first and second gratings spaced apart a measured distance, definable as $\Delta$, and angularly oriented with respect to one another at a selected angle, definable as $\theta$, the space between said gratings providing an unobstructed path to enable rays passing said first grating to directly reach said second grating, to produce preselected moiré patterns, said object being located in the path of said collimated rays between said source and said first grating, whereby said moiré patterns are visually modifiable as a function of angular deflections of rays by said object; and
means for measuring the deflection shown in the moiré pattern as selected points to enable quantitatively determining characteristics of said object as a function of the deflections of rays by said object.

10. An apparatus as recited in claim 9 wherein said object is a phase object with rays being deflected by it as a function of its indices of refraction.

11. An apparatus for mapping beam deflection caused by an object characterized by having an outer reflective surface, comprising:
source means for producing a beam of collimated rays of light;
moiré pattern producing means including first and second gratings spaced apart a measured distance, definable as $\Delta$, and angularly oriented with respect to one another at a selected angle, definable as $\theta$, the space between said gratings providing an unobstructed path to enable rays passing said first grating to directly reach said second grating, to produce preselected moiré patterns, said object being located in the path of said collimated rays between said source and said first grating, whereby said moiré patterns are visually modifiable as a function of angular deflections of rays by said object;
means for supporting said object on a plane which forms equal angles with the directions of the rays from said source to said plane and the non-deflected rays to said first grating, with points on said reflective surface deflecting reflected rays to said first grating at angles which relate to angles between said planes and tangential lines drawn through said points; and
means for measuring the deflection shown in the moiré pattern as selected points to enable quantitatively determining characteristics of said object as a function of the deflections of rays by said object.

* * * * *